United States Patent
Masamune et al.

(10) Patent No.: US 6,541,541 B2
(45) Date of Patent: Apr. 1, 2003

(54) AQUEOUS RESIN COMPOSITION

(75) Inventors: Kiyoshi Masamune, Saitama (JP); Naohiro Fujita, Saitama (JP); Ryo Ogawa, Saitama (JP); Koji Akimoto, Saitama (JP)

(73) Assignee: Asahi Denka Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/953,947

(22) Filed: Sep. 18, 2001

(65) Prior Publication Data

US 2002/0061941 A1 May 23, 2002

(30) Foreign Application Priority Data

Sep. 18, 2000 (JP) ......................................... 2000-281707

(51) Int. Cl.$^7$ .................................................. C08K 9/04
(52) U.S. Cl. ....................... 523/217; 523/404; 523/414; 525/528
(58) Field of Search ............................. 523/404, 414, 523/217; 525/528

(56) References Cited

U.S. PATENT DOCUMENTS 4,623,701 A    11/1986    Massingill
5,218,061 A *   6/1993    Kajiwara ..................... 525/523

FOREIGN PATENT DOCUMENTS

| EP | 0 151 661 A1 | 8/1985 |
|---|---|---|
| EP | 0 501 744 A2 | 9/1992 |
| GB | 2 115 424 A | 9/1983 |
| JP | 50-12394 | 2/1975 |
| JP | A 63-236733 | 10/1988 |
| JP | A 3-183644 | 8/1991 |
| JP | A 5-5020 | 1/1993 |
| JP | A 6-248055 | 9/1994 |
| JP | A 6-298904 | 10/1994 |
| JP | A 10-182951 | 7/1998 |

* cited by examiner

*Primary Examiner*—Robert Dawson
*Assistant Examiner*—D. Aylward
(74) *Attorney, Agent, or Firm*—Young & Thompson

(57) ABSTRACT

An aqueous resin composition comprising a polyepoxy compound represented by formula (I):

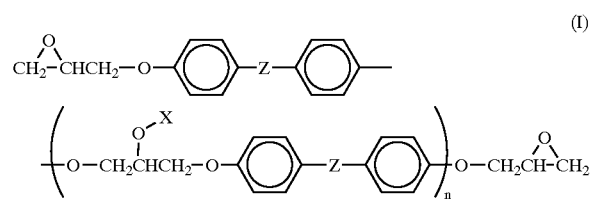

wherein n represents a number of from 0.1 to 20; Z represents a single bond, an alkylidene group having 1 to 4 carbon atoms or a sulfone group; and X represents a hydrogen atom or a glycidyl group, provided that at least 10% of nX's represent a glycidyl group, and water.

6 Claims, No Drawings

AQUEOUS RESIN COMPOSITION

FIELD OF THE INVENTION

The present invention relates generally to an aqueous resin composition and more particularly to an aqueous resin composition having high resistance to thermal coloring and suited for application to coatings on various substrates and sizing agents for fibrous materials such as glass fiber.

BACKGROUND OF THE INVENTION

Epoxy resins are widely used in coatings, adhesives, fiber treating agents, and the like for their excellent properties such as adhesion to various substrates, heat resistance, chemical resistance, and electrical and mechanical characteristics.

For ease in handling, epoxy resins for these applications have generally been supplied in the form of a solution in various low-boiling solvents, but use of low-boiling solvents has been restricted in view of the danger of fires, bodily harm, and adverse influences on the global environment. In recent years, aqueous resin compositions comprising an epoxy resin dispersed in water with the aid of an emulsifying agent have been developed and put to practical use.

On the other hand, fiber-reinforced plastics (FRPs) or fiber-reinforced thermoplastics (FRTPs) comprising a thermoplastic resin, such as polyolefins and polyesters, and a fibrous material, such as glass fiber, have been remarkably extending their use for their high strength and high rigidity.

In glass fiber production, molten glass is spun into filaments, and several hundreds to several thousands of the filaments are gathered into a bundle called a strand, which is cut to 3 to 6 mm lengths to obtain chopped strands, or several tens of the strands are bundled into a roving. A sizing agent is used to prevent glass filaments from splitting and fuzzing due to friction in the production of glass fibers or while blended with a thermoplastic resin.

Sizing agents conventionally applied to glass fiber or other fibrous materials include starch products, such as starch, processed starch, dextrin, and amylose (see JP-A-50-12394 and JP-A-3-183644); and synthetic polymers, such as carboxymethyl cellulose, polyvinyl alcohol, and an acrylamide-vinyl acetate copolymer (see JP-A-63-236733). These sizing agents have insufficient film-forming properties for sufficiently preventing glass fiber from fuzzing. They are also unsatisfactory in mechanical strength and hot water resistance.

To overcome these disadvantages, it has been proposed to use an aqueous resin comprising an epoxy resin as a sizing agent for fibrous materials. For example, JP-A-10-182951 discloses an aqueous epoxy resin dispersion suitable as a glass fiber sizing agent, which comprises a bisphenol type polyether compound comprising an alkylene oxide (80 to 800 mol) adduct of a bisphenol compound or a condensation product between the adduct and a polyisocyanate compound. The aqueous resin composition disclosed which contains a general epoxy resin still has the problem that FRPs or FRTPs containing the composition undergo coloring or have poor physical properties.

It has also been taught that a polyfunctional bisphenol type epoxy resin obtained by allowing epichlorohydrin to react with the secondary hydroxyl group of a general bisphenol compound diglycidyl ether is suitable for use in sealing materials for electric and electronic components, laminated sheets, etc. (see U.S. Pat. No. 4,623,701, JP-A-5-5020, JP-A-6-248055, and JP-A-6-298904). The publications, however, have no mention of preparation of an aqueous resin composition comprising these epoxy resins.

SUMMARY OF THE INVENTION

An object of the present invention is to provide an aqueous resin composition suitable as a sizing agent for fibrous materials, such as glass fiber, that will provide fiber-reinforced resins resistant to thermal coloring and excellent in physical properties.

As a result of extensive investigation, the present inventors have found that an aqueous resin composition comprising a specific polyepoxy compound can be used as a sizing agent for fibrous materials, particularly glass fiber, to provide fiber-reinforced resin products which undergo no thermal coloring and exhibit excellent physical properties.

The present invention provides an aqueous resin composition comprising (A) a polyepoxy compound represented by formula (I):

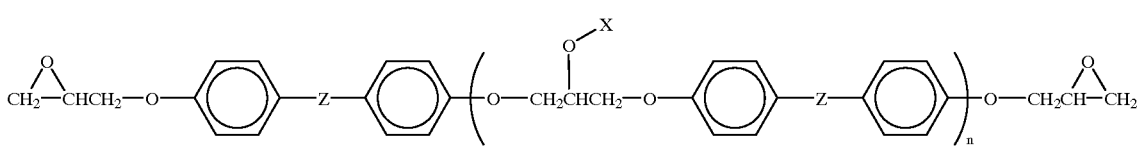

(I)

wherein n represents a number of from 0.1 to 20; Z represents a single bond, an alkylidene group having 1 to 4 carbon atoms or $SO_2$ (sulfone group); and X represents a hydrogen atom or a glycidyl group, provided that at least 10% of nX's represent a glycidyl group, and water.

DETAILED DESCRIPTION OF THE INVENTION

In formula (I), the alkylidene group having 1 to 4 carbon atoms as represented by Z includes methylidene, ethylidene, propylidene, and butylidene. n represents 0.1 to 20, preferably 1 to 15. X represents a hydrogen atom or a glycidyl group, provided that at least 10%, preferably 30% or more, of nX's represent a glycidyl group.

Where n is smaller than 0.1, or where less than 10% of nX's represent a glycidyl group, the aqueous resin composition has an insufficient content of the polyfunctional epoxy compound having tri- or higher functionality and, when used as a fibrous material sizing agent, fails to provide a fiber-reinforced resin with satisfactory physical properties. If n exceeds 20, the resulting aqueous resin composition tends to have poor stability.

The polyepoxy compound which can be used in the present invention as component (A) (hereinafter referred to as the polyepoxy compound (A)) is easily prepared by allowing a bisphenol diglycidyl ether having at least one secondary hydroxyl group in the molecule and epichlorohydrin to react in the presence of an alkali and a phase transfer catalyst.

The alkali which can be used includes sodium hydroxide, potassium hydroxide, and calcium hydroxide. The phase transfer catalyst which can be used includes tetramethylammonium chloride, tetrabutylammonium bromide, methyltrioctylammonium chloride, methyltridecylammonium chloride, N,N-dimethylpyrrolidinium chloride, N-ethyl-N-methylpyrrolidinium iodide, N-butyl-N-methylpyrrolidinium bromide, N-benzyl-N-methylpyrrolidinium chloride, N-ethyl-N-methylpyrroldinium bromide, N-butyl-N-methylmorpholinium bromide, N-butyl-N-methylmorpholinium iodide, N-allyl-N-methylmorpholinium bromide, N-methyl-N-benzylpiperidinium chloride, N-methyl-N-benzylpiperidinium bromide, N,N-dimethylpiperidinium iodide, N-methyl-N-ethylpiperidinium acetate, and N-methyl-N-ethylpiperidinium iodide. Tetramethylammonium chloride is preferred of them.

Epichlorohydrin is used in an amount of an equivalent or more, particularly 2 to 10 equivalents, per hydroxyl equivalent of the diglycidyl ether. The alkali is used in an amount of 0.1 to 2.0 mol, particularly 0.3 to 1.5 mol, per equivalent of the hydroxyl group to be glycidylated. The phase transfer catalyst is used in an amount of 0.01 to 10 mol %, particularly 0.2 to 2 mol %, based on the total weight of the reactants.

The reaction is carried out in the presence of a solvent, such as a hydrocarbon, an ether or a ketone, or an excess of epichlorohydrin can serve as a solvent.

The reaction is performed at 20 to 100° C., particularly 30 to 80° C. At reaction temperatures lower than 20° C., the reaction is slow to require an extended reaction time. Temperatures higher than 100° C. induce unfavorable side reactions.

For the details of the reaction, reference can be made, e.g., in H. Batzer and S. A. Zahir, *Journal of Applied Polymer Science*, vol. 19, pp. 609–617 (1975). The process of producing a glycidyl ether of a secondary alcohol disclosed in JP-A-5-239181 is also applicable. Additionally, the processes using dimethyl sulfoxide taught in JP-A-1-168722 and JP-A-5-5020 are also effective.

The starting diglycidyl ether of a bisphenol compound having at least one secondary hydroxyl group per molecule is a known compound. It is obtainable by either a one-stage process in which a bisphenol compound and epichlorohydrin are allowed to react or a two-stage process in which a diglycidyl ether of a low-molecular bisphenol compound and a bisphenol compound are allowed to react. The starting bisphenol compounds used in these processes include methylidenebisphenol (bisphenol F), ethylidenebisphenol, isopropylidenebisphenol (bisphenol A), butylidenebisphenol, biphenol, and sulfonebisphenol (bisphenol S).

It is preferred for the polyepoxy compound (A) to have an epoxy equivalent less than 1000, particularly less than 500. An epoxy equivalent exceeding 1000 tends to result in coloring of a cured product, and the resulting aqueous resin composition, when used as a sizing agent for reinforcing fiber, tends to reduce the physical properties of a resin composition containing the sized reinforcing fiber.

The aqueous resin composition according to the present invention may comprise other polyepoxy compounds in combination with the polyepoxy compound (A). Usable other polyepoxy compounds include polyglycidyl ether compounds of polyhydric phenol compounds, such as hydroquinone, resorcin, pyrocatechol, phloroglucinol, dihydroxynaphthalene, biphenol, methylenebisphenol (bisphenol F), methylenebis(o-cresol), ethylidenebisphenol, isopropylidenebisphenol (bisphenol A), isopropylidenebis (o-cresol), tetrabromobisphenol A, 1,3-bis(4-hydroxycumylbenzene), 1,4-bis(4-hydroxycumylbenzene), 1,1,3-tris(4-hydroxyphenyl)butane, 1,1,2,2-tetra(4-hydroxyphenyl)ethane, thiobisphenol, sulfobisphenol, oxybisphenol, phenol novolak, o-cresol novolak, ethylphenol novolak, butylphenol novolak, octylphenol novolak, resorcin novolak, bisphenol A novolak, bisphenol F novolak, terpene diphenol, and (1-(4-(1-(4-hydroxyphenyl)-1-methyl-ethyl)phenyl)ethylidene)bisphenol; polyglycidyl ether compounds of ethylene oxide and/or propylene oxide adducts of the above-enumerated polyhydric phenol compounds; polyglycidyl ether compounds of hydrogenation products of the above-enumerated polyhydric phenol compounds; polyglycidyl ethers of polyhydric alcohols, such as ethylene glycol, propylene glycol, butylene glycol, hexanediol, polyglycol, thiodiglycol, glycerol, trimethylolpropane, pentaerythritol, sorbitol, bisphenol A-ethylene oxide adducts, and dicyclopentadienedimethanol; homo- or copolymers of glycidyl methacrylate or glycidyl esters of aliphatic, aromatic or alicyclic polybasic acids, such as maleic acid, fumaric acid, itaconic acid, succinic acid, glutaric acid, suberic acid, adipic acid, azelaic acid, sebacic acid, dimer acids, trimer acids, phthalic acid, isophthalic acid, terephthalic acid, trimellitic acid, trimesic acid, pyromellitic acid, tetrahydrophthalic acid, hexahydrophthalic acid, and endomethylenetetrahydrophthalic acid; epoxy compounds having a glycidylamino group, such as N,N-diglycidylaniline and bis(4-(N-methyl-N-glycidylamino)phenyl)methane; cyclic olefin epoxides, such as vinylcyclohexene diepoxide, dicyclopentanediene diepoxide, 3,4-epoxycyclohexylmethyl 3,4-epoxy-cyclohexanecarboxylate, 3,4-epoxy-6-methylcyclohexylmethyl 6-methylcyclohexanecarboxylate, and bis(3,4-epoxy-6-methylcyclohexylmethyl) adipate; epoxidized conjugated diene polymers, such as epoxidized polybutadiene and an epoxidized styrene-butadiene copolymer; and heterocyclic epoxy compounds, such as triglycidyl isocyanurate. These polyepoxy compounds may have been internally crosslinked by prepolymerization of the isocyanato end group or may have been polymerized with a polyfunctional active hydrogen compound.

The polyepoxy compound (A) and the other polyepoxy compounds can be subjected to various modifications. For example, they can be rendered self-emulsifiable by introducing an anionic group, e.g., a carboxyl group, or a cationic group, e.g., an amino group or an ammonium group. They can be made reactive by introducing a reactive group, such as an acetoacetate group or an alkoxysilyl group, or be made flame-retardant by introducing a phosphoric ester group.

In dispersing the polyepoxy compound (A) in water to prepare the aqueous resin composition of the present invention, an emulsifying agent is used preferably. It is particularly preferred to use, as an emulsifying agent, (B) a polyether compound obtained by condensing at least one polyol compound selected from the group consisting of (a) a bisphenol compound-alkylene oxide adduct, (b) polyethylene glycol, and (c) a polyoxyethylene-polyoxypropylene block or random copolymer with (d) a polyisocyanate compound or a polyether compound obtained by condensing (a) a bisphenol compound-alkylene oxide adduct and at least one polyol compound selected from the group consisting of (b) polyethylene glycol and (c) a polyoxyethylene-polyoxypropylene block or random copolymer with (d) a polyisocyanate compound. Use of the emulsifying agent (B) produces an aqueous resin composition which exhibits excellent storage stability and provides a cured product prevented from thermal coloring.

The bisphenol compound which can provide the bisphenol compound-alkylene oxide adduct as component (a) includes those recited above. The alkylene oxide to be added includes ethylene oxide, propylene oxide, butylene oxide, pentylene oxide, hexylene oxide, heptylene oxide, octylene oxide, nonylene oxide, and decylene oxide, with ethylene oxide and/or propylene oxide being preferred.

The number of moles of the alkylene oxide added to the bisphenol compound is preferably 1 to 800, still preferably 2 to 400. If it is less than 1, the resulting aqueous dispersion is liable to have reduced stability. If it is more than 800, the aqueous dispersion is apt to suffer flocculation. Where component (a) is combined with component (b) and/or component (c), the number of moles of the alkylene oxide added is preferably 1 to 80, still preferably 2 to 40.

The polyoxyethylene-polyoxypropylene block or random copolymer as component (c) preferably comprises 50 to 1000, particularly 75 to 500, oxyethylene units and 1 to 100, particularly 5 to 80, oxypropylene units. Component (c) having less than 50 oxyethylene units tends to result in reduced emulsion stability. Existence of more than 1000 oxyethylene units tends to result in flocculation.

Component (c) having a block structure, such as polyoxyethylene-polyoxypropylene or polyoxyethylene-polyoxypropylene-polyoxyethylene, is particularly preferred to provide a more stable aqueous dispersion.

The polyisocyanate compound as component (d) includes aliphatic, alicyclic or aromatic polyisocyanate compounds, such as 2,4-tolylene diisocyanate, 2,6-tolylene diisocyanate, 4,4-diphenylmethane diisocyanate, phenylene diisocyanate, xylylene diisocyanate, tetramethylxylylene diisocyanate, tetramethylene diisocyanate, hexamethylene diisocyanate, lysine diisocyanate ester, 1,4-cyclohexylene diisocyanate, 4,4'-dicyclohexylmethane diisocyanate, 3,3'-dimethoxy-4,4'-biphenylene diisocyanate, 1,5-naphthalene diisocyanate, 1,5-tetrahydronaphthalene diisocyanate, and isophorone diisocyanate.

Component (d) is preferably used in an amount of 0.1 to 1.0 isocyanato equivalent, particularly 0.4 to 0.9 isocyanato equivalent, per equivalent of the alcoholic hydroxyl group contained in components (a), (b) and (c). Less than 0.1 equivalent may fail to produce a desired condensation product. Use of more than 1.0 equivalent of component (d) tends to result in formation of a polymerized product which is no more effective as an emulsifying agent.

Where component (a) is used in combination with component (b) and/or component (c), a preferred molar ratio of the former to the latter is 2:1 to 1:10, particularly 1:1 to 1:5. Where component (a) is less than this range, the aqueous dispersion is apt to flocculate. Where component (a) is more than that, the aqueous dispersion tends to have reduced stability.

In preparing the above-described polyether compound (B), generally employed methods for obtaining polyether compounds from polyols and polyisocyanates can be applied with no particular restriction. For example, components (a), (b) and (c) are mixed beforehand, and the mixture is allowed to react with component (d). Or, components (a), (b) and (c) are separately allowed to react with component (d).

The condensation reaction can be carried out in an organic solvent. Suitable organic solvents include ketones, such as acetone, methyl ethyl ketone, and isobutyl ketone; esters, such as ethyl acetate and butyl acetate; ethers, such as dioxane and tetrahydrofuran; aromatic hydrocarbons, such as toluene and xylene; amides, such as dimethylformamide and dimethylacetamide; sulfoxides, such as dimethyl sulfoxide; and mixtures of two or more thereof.

The condensation reaction can be carried out in the presence of a catalyst. Suitable catalysts include amines, such as triethylamine, N-ethylmorpholine, and triethylenediamine, and tin compounds, such as dibutyltin dilaurate and dioctyltin dilaurate.

The aqueous resin composition of the present invention can further comprise one or more of other emulsifying agents. Useful emulsifying agents include nonionic surface active agents, such as lauryl ether-ethylene oxide adducts, cetyl ether-ethylene oxide adducts, stearyl ether-ethylene oxide adducts, oleyl ether-ethylene oxide adducts, octyl phenyl ether-ethylene oxide adducts, nonyl phenyl ether-ethylene oxide adducts, sorbitan monolaurate, sorbitan monopalmitate, sorbitan monostearate, sorbitan tristearate, sorbitan monooleate, sorbitan trioleate, sorbitan sesquioleate, sorbitan distearate, sorbitan monolaurate-ethylene oxide adducts, sorbitan monopalmitate-ethylene oxide adducts, sorbitan monostearate-ethylene oxide adducts, sorbitan tristearate-ethylene oxide adducts, sorbitan monooleate-ethylene oxide adducts, sorbitan trioleate-ethylene oxide adducts, polyoxyethylene sorbitol tetraoleate, glycerol monostearate, polyethylene glycol monolaurate, polyethylene glycol monostearate, polyethylene glycol distearate, polyethylene glycol monooleate, polyethylene alkylamines, castor oil-ethylene oxide adducts, hydrogenated castor oil-ethylene oxide adducts, and condensates thereof with a polyisocyanate compound; anionic surface active agents, such as fatty acid salts, sulfuric ester salts of higher alcohols, sulfuric ester salts of liquid fats and oils, aliphatic amine sulfates, aliphatic amide sulfates, aliphatic alcohol phosphates, dibasic acidic fatty acid ester sulfonates, fatty acid amide sulfonates, alkylarylsulfonic acids, and formaldehyde-condensed naphthalates; cationic surface active agents, such as primary amine salts, secondary amine salts, tertiary amine salts, quaternary amine salts, and pyridinium salts; and amphoteric surface active agents, such as betaine types, sulfuric ester types, and sulfonic acid types.

The emulsifying agents are preferably used in an amount of 0.01 to 30 parts by weight, particularly 0.1 to 20 parts by weight, per 100 parts by weight of the polyepoxy compound (A). In an amount less than 0.01 part, the emulsifying agent cannot produce sufficient effects as an emulsifying agent. If the emulsifying agent is added in an amount more than 30 parts, the resulting aqueous resin composition tends to have reduced fiber binding properties when used as a reinforcing fiber sizing agent or tends to reduce the physical properties of a resin composition containing the sized reinforcing fiber.

The aqueous resin composition of the present invention contains 20 parts by weight or more, particularly 50 parts by weight or more, of water per 100 parts by weight of the polyepoxy compound (A). With a water content less than 20 parts, it is difficult to retain the stability as an aqueous dispersion. While not limiting, the upper limit of the water content is preferably 1000 parts by weight or less, particularly 500 parts by weight or less, in view of handling. The aqueous resin composition can further be diluted with water according to the use.

The method of preparing the aqueous resin composition is not limited. For example, the emulsifying agent is previously incorporated into either one or both of the polyepoxy compound (A) and water, and the polyepoxy compound (A) and water are mixed up by stirring. Or, the polyepoxy compound (A), water, and the emulsifier are mixed up all together by stirring.

Stirring machines to be used for stirring the components include a disper, a homomixer, a rotary homomixer, and a high-pressure homogenizer.

If desired, an organic solvent may be used in dispersing the polyepoxy compound (A) in water. The organic solvents which can be used here include ketones, such as acetone, methyl isopropyl ketone, and cyclohexanone; ethers, such as tetrahydrofuran, 1,2-dimethoxyethane, 1,2-diethoxyethane, propylene glycol monomethyl ether, and propylene glycol monomethyl ether acetate; esters, such as ethyl acetate and n-butyl acetate; alcohols, such as isobutanol, n-butanol, isopropyl alcohol, n-propyl alcohol, and amyl alcohol; aromatic hydrocarbons, such as benzene, toluene, and xylene; terpene hydrocarbon oils, such as turpentine oil, D-limonene, and pinene; paraffinic solvents, such as mineral spirits, Swazol #310 (available from Maruzen Petrochemical Co., Ltd.), Sorvesso #100 (available from Exxon Corp.); halogenated aliphatic hydrocarbons, such as carbon tetrachloride, chloroform, trichloroethylene, and methylene chloride; halogenated aromatic hydrocarbons, such as chlorobenzene; aniline, triethylamine, pyridine, dioxane, acetic acid, acetonitrile, and carbon disulfide. These organic solvents can be used either individually or as a mixture of two or more thereof The organic solvent is usually used in an amount of up to 100 parts by weight per 100 parts by weight of water.

The aqueous resin composition of the present invention usually contains a curing agent for an epoxy resin. Useful curing agents include polyalkylpolyamines, such as diethylenetriamine, triethylenetriamine, and tetraethylenepentamine; alicyclic polyamines, such as 1,2-diaminocyclohexane, 1,4-diamino-3,6-diethylcyclohexane, and isophoronediamine; and aromatic polyamines, such as m-xylylenediamine, diaminodiphenylmethane, and diaminodiphenylsulfone. Also included are polyepoxy-addition products prepared by modifying these polyamines with various epoxy resins, such as glycidyl ethers, e.g., phenyl glycidyl ether, butyl glycidyl ether, bisphenol A diglycidyl ether, and bisphenol F diglycidyl ether, or carboxylic acid glycidyl esters, in a usual manner; amidation products prepared by modifying these polyamines with carboxylic acids, such as phthalic acid, isophthalic acid and a dimer acid, in a usual manner; and Mannich reaction products prepared by modifying these polyamines with aldehydes, such as formaldehyde, or phenols having at least one reactive site for forming an aldehyde group on the nucleus thereof, such as phenol, cresol, xylenol, t-butylphenol and resorcin, in a usual manner. Latent curing agents, such as dicyandiamide, acid anhydrides, and imidazoles, are also useful.

If desired, the aqueous resin composition of the present invention may contain additives commonly employed in the art. Useful additives include curing catalysts; reactive or non-reactive diluents (or plasticizers), such as monoglycidyl ethers, dioctyl phthalate, dibutyl phthalate, benzyl alcohol, and coal tar; fillers or pigments, such as glass fiber, carbon fiber, cellulose, siliceous sand, cement, kaolin, clay, aluminum hydroxide, bentonite, talc, silica, fine silica powder, titanium dioxide, carbon black, graphite, iron oxide, and bituminous substances; silane coupling agents, such as γ-aminopropyltriethoxysilane, N-β-(aminoethyl)-γ-aminopropyltriethoxysilane, N-γ-(aminoethyl)-N'-β-(aminoethyl)-γ-aminopropyltriethoxysilane, γ-anilinopropyltriethoxysilane, γ-glycidoxypropyltriethoxysilane, β-(3,4-epoxycyclohexyl) ethyltriethoxysilane, vinyltriethoxysilane, N-β-(N-vinylbenzylaminoethyl)-γ-aminopropyltriethoxysilane, γ-methacryloxypropyltrimethoxysilane, γ-chloropropyltrimethoxysilane, and γ-mercaptopropyltrimethoxysilane; lubricants, such as candelilla wax, carnauba wax, Japan wax, insect wax, bees wax, lanolin, whale wax, montan wax, petroleum wax, fatty acid waxes, fatty acid esters, fatty acid ethers, aromatic esters, and aromatic ethers; thickeners; thixotropic agents; antioxidants; light stabilizers; ultraviolet absorbers; flame retardants; antifoaming agents; rust inhibitors; colloidal silica, and colloidal alumina. Tacky resins, such as xylene resins and petroleum resins, may be used in combination.

The aqueous resin composition can further contain other aqueous resins, such as various starch products, cellulose derivatives, e.g., hydroxyethyl cellulose, methyl cellulose, and carboxymethyl cellulose, gelatin, casein; synthetic water-soluble polymers, such as polyvinyl alcohol and its derivatives, polyvinylpyrrolidone, styrene-maleic anhydride copolymers, ethylene-maleic anhydride copolymers, polyacrylamide and its derivatives, and polyethylene glycol; and latices of styrene-butadiene copolymers, polyvinyl acetate, polyurethane, polyacrylic esters, vinyl chloride-vinyl acetate copolymers, ethylene-vinyl acetate copolymers, ethylene-butadiene-acrylic copolymers, and polyvinylidene chloride.

Applications of the aqueous resin composition of the present invention are not particularly limited and include coatings and adhesives on various substrates. The aqueous resin composition is especially suitable as a sizing agent for fibrous materials, such as glass fiber, carbon fibers, ceramic fiber, metal fiber, and aramid fiber, particularly glass fiber.

The glass fiber to which the aqueous resin composition is useful as a sizing agent can be any of alkali glass, low-alkali glass, and alkali-free glass. Methods of producing glass fiber include, but are not limited to, a roving method, a chopped strand method, and a milled fiber method.

While not particularly limiting, the glass fiber preferably has a fiber length of 0.5 to 10 mm and a diameter of 1 to 50 µm, particularly a length of 1 to 5 mm and a diameter of 2 to 20 µm, for obtaining particularly satisfactory physical properties or surface properties.

Glass fiber having been treated with a sizing agent comprising the aqueous resin composition of the present invention is mixed with thermoplastic resins or thermosetting resins to provide glass fiber-reinforced compositions (FRTPs and FRPs) with excellent physical properties. The thermoplastic resins include polypropylene, polystyrene, polycarbonate, polyethylene terephthalate, polybutylene terephthalate, polyphenylene sulfide, polyamide, polyphenylene oxide, acrylonitrile-styrene copolymer resins (AS resins), acrylonitrile-butadiene-styrene copolymer resins (ABS resins), and polyacetal resins. The thermosetting resins include phenolic resins, polyimide resins, unsaturated polyester resins, epoxy resins, silicone resins, and polyurethane resins.

The FRTPs are useful as molding materials of heat-resistant parts of heat appliances, such as irons and driers; electric and electronic parts, such as connectors, switches and cases; parts of office equipment, such as computers, facsimiles and copiers; automotive interior and exterior parts, such as tanks, engine covers, outside mirrors, and bumpers; and parts of clocks, cameras, gas burners, etc. The FRPs are useful as molding materials of house equipment, such as integrally molded bath rooms, unit kitchens, and septic tanks; automotive parts, such as gasoline tanks, motorcycle parts, and sunroofs; domestic appliances, such as dishwashers; small-sized ships; helmets; and the like. In recent years, an SMS (sheet molding compound) method or a BMC (bulk molding compound) method using FRPs has come to be known. In particular, application of the glass fiber-reinforced resin composition of the present invention to the SMC method is fit for producing a thick film because of the excellent glass fiber bundling properties, pH stability of the sizing agent in an acidic region, adequate styrene solubility, and strength of an SMC sheet.

The present invention will now be illustrated in greater detail with reference to Examples, but it should be understood that the invention is not construed as being limited thereto. Unless otherwise noted, all the parts and percents are by weight.

PREPARATION EXAMPLE 1

In a flask equipped with a reflux condenser, a stirrer, an evacuator, and a dropping funnel were charged 47.5 parts of a solid epoxy resin (1) (bisphenol A diglycidyl ether; epoxy equivalent: 475; n=2.1), 46.3 parts of epichlorohydrin, and 0.2 part of tetramethylammonium chloride, and a 48% aqueous solution of 5.5 parts of sodium hydroxide was put into the dropping funnel. The mixture in the flask was heated at 50 to 60° C. and 80 Torr under reflux while dropping the sodium hydroxide aqueous solution over 2 hours and removing produced water by azeotropy. After completion of the dropwise addition, the reaction was continued for an additional 2 hour period. The reaction mixture was cooled and filtered, and the solvent was removed by means of an evaporator to give a polyepoxy compound (P-1) having an epoxy equivalent of 310. The ratio of a glycidyl group to the nX's in formula (I) was 62%. This ratio will hereinafter referred to as G.

PREPARATION EXAMPLE 2

In a flask equipped with a reflux condenser, a stirrer, an evacuator, and a dropping funnel were charged 65 parts of a solid epoxy resin (2) (bisphenol A diglycidyl ether; epoxy equivalent: 650; n=3.4), 46.3 parts of epichlorohydrin, and 0.2 part of tetramethylammonium chloride, and a 48% aqueous solution of 8.5 parts of sodium hydroxide was put into the dropping funnel. The mixture in the flask was heated at 50 to 60° C. and 80 Torr under reflux while dropping the sodium hydroxide aqueous solution over 2 hours and removing produced water by azeotropy. After completion of the dropwise addition, the reaction was continued for an additional 2 hour period. The reaction mixture was cooled and filtered, and the solvent was removed by means of an evaporator to give a polyepoxy compound (P-2) having an epoxy equivalent of 340 (G=65%).

PREPARATION EXAMPLE 3

In a flask equipped with a reflux condenser, a stirrer, an evacuator, and a dropping funnel were charged 200 parts of a solid epoxy resin (3) (bisphenol A diglycidyl ether; epoxy equivalent: 2000; n=5.8), 46.3 parts of epichlorohydrin, and 0.2 part of tetramethylammonium chloride, and a 48% aqueous solution of 15 parts of sodium hydroxide was put into the dropping funnel. The mixture in the flask was heated at 50 to 60° C. and 80 Torr under reflux while dropping the sodium hydroxide aqueous solution over 2 hours and removing produced water by azeotropy. After completion of the dropwise addition, the reaction was conditioned for an additional 2 hour period. The reaction mixture was cooled and filtered, and the solvent was removed by means of an evaporator to give a polyepoxy compound (P-3) having an epoxy equivalent of 420 (G=55%).

PREPARATION EXAMPLE 4

In a flask equipped with a reflux condenser, a stirrer, an evacuator, and a dropping funnel were charged 47.5 parts of the solid epoxy resin (1), 92.5 parts of epichlorohydrin, and 0.4 part of tetramethylammonium chloride, and a 48% aqueous solution of 4.9 parts of sodium hydroxide was put into the dropping funnel. The mixture in the flask was heated at 50 to 60° C. and 80 Torr under reflux while dropping the sodium hydroxide aqueous solution over 2 hours and removing produced water by azeotropy. After completion of the dropwise addition, the reaction was continued for an additional 2 hour period. The reaction mixture was cooled and filtered, and the solvent was removed by means of an evaporator to give a polyepoxy compound (P-4) having an epoxy equivalent of 278 (G=82%).

PREPARATION EXAMPLE 5

In a flask equipped with a reflux condenser, a stirrer, an evacuator, and a dropping funnel were charged 65 parts of the solid epoxy resin (2), 162 parts of epichlorohydrin, and 81.0 part of dimethyl sulfoxide. An aqueous solution of 9.1 parts of sodium hydroxide was added dropwise to the mixture while stirring the mixture at 70° C. After the addition, the reaction was further continued for 3 hours. Then, the unreacted epichlorohydrin and the most of dimethyl sulfoxide were removed by evaporation under reduced pressure. The reaction product containing by-produced salts and residual dimethyl sulfoxide was dissolved in 150 parts of methyl isobutyl ketone. To the solution was added 2 parts of a 30% aqueous solution of sodium hydroxide. The mixture was allowed to react at 70° C. for 2 hours. The reaction mixture was washed with water and separated into an oily phase and an aqueous phase. The solvent was removed by evaporation in an evaporator to give an epoxy compound (P-5) having an epoxy equivalent of 295 (G=90%).

PREPARATION EXAMPLE 6

Preparation of Emulsifier (1):

A mixture of 324 parts (0.2 mol) of a bisphenol A-ethylene oxide (3 mol) adduct, 2680 parts (0.4 mol) of a polyethylene-polypropylene (4:1 by weight) block copolymer, and 50 parts (0.4 mol) of hydrogenated diphenylmethane diisocyanate was prepared. Three grams of Adekastab BT-11 (dibutyltin laurate, available from Asahi Denka Kogyo K.K.) was added to the mixture as a catalyst. The mixture was allowed to react at 80° C. for 2 hours to prepare an emulsifier (1).

EXAMPLES 1 TO 5

Each of the epoxy compounds (P-1) to (P-5) (440 parts), the emulsifier (1) (100 parts), and propylene glycol monomethyl ether (10 parts) were mixed and heated up to 50° C. to prepare a uniform mixture. In the case with the epoxy compound (P-3), the mixture was heated to about 100° C. to be made uniform. While stirring the mixture in a homomixer, 430 parts of water was slowly added thereto to prepare an aqueous resin composition (SP-1 through SP-5).

EXAMPLE 6

The epoxy compound (P-1) (140 parts), the solid epoxy resin (3) (300 parts), the 10 emulsifier (1) (100 parts), and propylene glycol monomethyl ether (10 parts) were mixed up and heated to 50° C. to form a uniform mixture. While the mixture was stirred in a homomixer, 430 parts of water was slowly added to prepare an aqueous resin composition (SP-6).

EXAMPLES 7 TO 11

Each of the epoxy compounds (P-1) to (P-5) (440 parts), the emulsifier (1) (60 parts), and propylene glycol monomethyl ether (70 parts) were mixed up and heated up to 50° C. to prepare a uniform mixture. In the case with the epoxy compound (P-3), the mixture was heated to about 100° C. to be made uniform. While stirring the mixture in a homomixer, 430 parts of water was slowly added thereto to prepare an aqueous resin composition (SP-7 through SP-11).

EXAMPLE 12

The epoxy compound (P-1) (140 parts), the solid epoxy resin (3) (300 parts), the emulsifier (1) (60 parts), and propylene glycol monomethyl ether (70 parts) were mixed up and heated to 50° C. to form a uniform mixture. While the mixture was stirred in a homomixer, 430 parts of water was slowly added to prepare an aqueous resin composition (SP-11).

COMPARATIVE EXAMPLE 1

The solid epoxy resin (1) (440 parts), the emulsifier (1) (100 parts), and propylene glycol monomethyl ether (10 parts) were mixed up and heated to 50° C. to form a uniform mixture. While the mixture was stirred in a homomixer, 430 parts of water was slowly added to prepare an aqueous resin composition (HSP-1).

COMPARATIVE EXAMPLE 2

Epikote #152 (phenol novolak epoxy resin, available from Yuka Shell Epoxy; epoxy equivalent: 190) (440 parts), the emulsifier (1) (100 parts), and propylene glycol monomethyl ether (10 parts) were mixed up and heated to 50° C. to form a uniform mixture. While the mixture was stirred in a homomixer, 430 parts of water was slowly added to prepare an aqueous resin composition (HSP-2).

COMPARATIVE EXAMPLE 3

The solid epoxy resin (1) (440 parts), the emulsifier (1) (60 parts), and propylene glycol monomethyl ether (70 parts) were mixed up and heated to 50° C. to form a uniform mixture. While the mixture was stirred in a homomixer, 430 parts of water was slowly added to prepare an aqueous resin composition (HSP-3).

COMPARATIVE EXAMPLE 4

Epikote #152 (phenol novolak epoxy resin, available from Yuka Shell Epoxy; epoxy equivalent: 190) (440 parts), the emulsifier (1) (60 parts), and propylene glycol monomethyl ether (70 parts) were mixed up and heated to 50° C. to form a uniform mixture. While the mixture was stirred in a homomixer, 430 parts of water was slowly added to prepare an aqueous resin composition (HSP-4).

APPLICATION EXAMPLE 1

Use as Glass Fiber Sizing Agent:

The aqueous resin compositions obtained in Examples 1 to 12 and Comparative Examples 1 to 4 were evaluated for performance as a glass fiber sizing agent in accordance with the following test method. The results obtained are shown in Tables 2 through 5.

A sizing agent was prepared, which consisted of 3.5% of HUX390 (aqueous polyurethane resin; available from Asahi Denka Kogyo K.K.), 0.5% of γ-aminopropyltriethoxysilane, 0.3% of carnauba wax, 5.0% of the aqueous resin composition, and 90.7% of water. A thousand and six hundred glass filaments having a diameter of 13 μm were bundled into a strand by applying the sizing agent at an add-on of 1.0% on a solid basis. The strand was chopped and dried to obtain chopped strands of 3 mm in length.

The chopped strands were kneaded with a matrix resin according to the formulation shown in Table 1 in a twin-screw extruder and pelletized through a pelletizer. The pellets were injection molded to prepare test specimens. The temperature conditions of kneading and injection molding are shown in Table 1.

TABLE 1

|  | Formulation (part) | | |
|---|---|---|---|
|  | 1 | 2 | 3 |
| Components: | | | |
| Polybutylene terephthalate | 70 | | |
| Polyamide 66 | | 70 | |
| Polycarbonate | | | 70 |
| Chopped strands | 30 | 30 | 30 |
| Temperature conditions: | | | |
| Extruder temperature (° C.) | 260 | 280 | 300 |
| Injection molding machine temperature (° C.) | 260 | 300 | 300 |
| Injection mold temperature (° C.) | 80 | 110 | 100 |

The tensile strength (kg/cm$^2$), wet strength (kg/cm$^2$) and Izod impact strength (kgcm/cm$^2$) of the specimens were measured in accordance with ASTM. The hue (b value) of the specimens was measured with a color difference meter. The flexural strength (kg/cm$^2$) of the specimens of formulation 1 was measured. The wet strength was measured by a tensile test on specimens that had been treated in a pressure cooker at 120° C. under a steam pressure of 2 atm. for 40 hours.

TABLE 2

| | Formulation 1 | | | | | | | |
|---|---|---|---|---|---|---|---|---|
| | Example | | | | | | Comparative Example | |
| | 1 | 2 | 3 | 4 | 5 | 6 | 1 | 2 |
| Tensile Strength | 1240 | 1230 | 1240 | 1230 | 1240 | 1250 | 1140 | 1220 |
| Wet Strength | 820 | 810 | 830 | 830 | 850 | 840 | 550 | 820 |
| Flexural Strength | 2240 | 2230 | 2240 | 2240 | 2250 | 2230 | 2050 | 2240 |
| Izod Impact Strength | 10.0 | 10.1 | 9.9 | 10.1 | 10.2 | 10.0 | 8.5 | 10.5 |
| Hue (b Value) | 9.2 | 9.0 | 9.2 | 9.2 | 9.3 | 9.1 | 8.9 | 11.0 |

TABLE 3

Formulation 1

|  | Example | | | | | | Comparative Example | |
|---|---|---|---|---|---|---|---|---|
|  | 7 | 8 | 9 | 10 | 11 | 12 | 3 | 4 |
| Tensile Strength | 1250 | 1250 | 1250 | 1240 | 1240 | 1260 | 1130 | 1230 |
| Water Resistant Strength | 820 | 820 | 820 | 820 | 840 | 840 | 560 | 810 |
| Flexural Strength | 2240 | 2230 | 2230 | 2240 | 2240 | 2230 | 2040 | 2240 |
| Izod Impact Strength | 10.1 | 10.1 | 10.0 | 10.1 | 10.2 | 10.1 | 8.6 | 10.5 |
| Hue (b Value) | 9.0 | 8.9 | 9.1 | 9.0 | 9.2 | 9.0 | 8.8 | 11.1 |

TABLE 4

Formulation 2

|  | Example | | | | | | Comparative Example | |
|---|---|---|---|---|---|---|---|---|
|  | 7 | 8 | 9 | 10 | 11 | 12 | 3 | 4 |
| Tensile Strength | 1690 | 1660 | 1680 | 1680 | 1680 | 1650 | 1620 | 1690 |
| Wet Strength | 920 | 910 | 930 | 930 | 950 | 950 | 780 | 920 |
| Izod Impact Strength | 8.6 | 8.5 | 8.7 | 8.5 | 8.7 | 8.6 | 7.8 | 8.9 |
| Hue (b Value) | 3.8 | 3.7 | 3.9 | 3.8 | 3.8 | 3.7 | 3.7 | 6.3 |

TABLE 5

Formulation 3

|  | Example | | | | | | Comparative Example | |
|---|---|---|---|---|---|---|---|---|
|  | 7 | 8 | 9 | 10 | 11 | 12 | 3 | 4 |
| Tensile Strength | 1180 | 1190 | 1180 | 1180 | 1180 | 1150 | 1160 | 1180 |
| Wet Strength | 760 | 750 | 760 | 730 | 750 | 750 | 690 | 740 |
| Izod Impact Strength | 9.8 | 9.7 | 9.9 | 9.5 | 9.7 | 9.6 | 8.5 | 9.9 |
| Hue (b Value) | 1.5 | 1.8 | 1.4 | 1.7 | 1.8 | 1.3 | 1.2 | 4.9 |

APPLICATION EXAMPLE 2

Use as Water Borne Coating

The aqueous resin compositions obtained in Examples 1 to 6 and Comparative Examples 1 and 2 were evaluated for performance as a water borne coating in accordance with the following test method. The results obtained are shown in Table 6 below.

Four parts of Adekacol W-284 (dispersant, available from Asahi Denka Kogyo K.K.; solid content: 40%), 30 parts of water, 30 parts of titanium oxide, 30 parts of calcium carbonate, and 30 parts of talc were dispersed in a disper or a ball mill. The resulting aqueous dispersion was mixed with 200 parts of the aqueous resin composition to prepare an aqueous coating composition.

Adeka Hardener EH-040-1 (modified aliphatic polyamine hardener, available from Asahi Denka Kogyo K.K.; active hydrogen equivalent: 187) was mixed into the coating composition at an epoxy:active hydrogen equivalent ratio of 1:1.1. The resulting coating composition was applied to a cold-reduced steel sheet (JIS G3141) to a film thickness of 100 to 150 $\mu$m and aged at 25° C. for one week to prepare specimens. Physical properties of the coating film were measured as follows. For the measurement of adhesion, a mortar plate was used as a substrate in place of the steel sheet.

1) Pencil Hardness

A pencil hardness was measured in accordance with JIS K5400.

2) Corrosion Resistance

The specimen was subjected to a salt spray test for 200 hours in accordance with JIS K5400. The corrosion resistance was graded as follows.

A . . . Rust or lifting occurred.

B . . . Rust or lifting occurred slightly.

C . . . Rust or lifting occurred considerably.

3) Weather Resistance

The specimen was deteriorated in a weather-o-meter at 83° C. for 200 hours, and a change in b value (Δb) was measured with a color difference meter.

4) Impact Resistance

The impact resistance (height of the falling weight; cm) was measured with a Du Pont type impact tester in accordance with JIS K5400.

5) Adhesion

The adhesion (kgf) was measured with an adhesion tester according to JIS K5400.

TABLE 6

|  |  | Example | | | | | | Comparative Example | |
|---|---|---|---|---|---|---|---|---|---|
|  |  | 1 | 2 | 3 | 4 | 5 | 6 | 1 | 2 |
| Pencil Hardness | | 2H–3H | 2H–3H | 2H–3H | 2H–3H | 2H–3H | 2H–3H | HB–H | 3H |
| Corrosion Resistance | Lifting | 1 | 1 | 1 | 1 | 1 | 1 | 1 | 1 |
|  | Rust | 1 | 1 | 1 | 1 | 1 | 1 | 3 | 1 |
| Weather Resistance | | 3.8 | 3.9 | 4.1 | 4.0 | 3.8 | 3.9 | 4.0 | 9.8 |
| Impact Resistance | | 50< | 50< | 50< | 50< | 50< | 50< | 50< | 10 |
| Adhesion | Dry | 35< | 35< | 35< | 35< | 35< | 35< | 35< | 10 |
|  | Wet | 35< | 35< | 35< | 35< | 35< | 35< | 20 | 10 |

As can be seen from the results in Tables 2 through 6, the glass fiber-reinforced resin composition obtained by using, as a glass fiber sizing agent, the aqueous resin composition of Comparative Example 1, which was prepared from a general bisphenol epoxy resin, had a low tensile strength and underwent a considerable reduction in tensile strength after water treatment. The aqueous resin composition of Comparative Example 2, which was prepared from a novolak phenol epoxy resin, showed improvement in tensile strength of a glass fiber-reinforced resin composition but caused remarkable coloring. When these comparative aqueous resin compositions were used as a water borne coating, the coating film of the former was inferior in corrosion resistance and water resistance, and that of the latter was inferior in weather resistance, impact resistance and adhesion.

The glass fiber-reinforced resin compositions obtained by using, as a glass fiber sizing agent, the aqueous resin compositions of the present invention (Examples 1 to 6), which were prepared from the specific polyepoxy compound, underwent no coloring, exhibited satisfactory tensile strength, and showed only a slight reduction in tensile strength after water treatment. When these aqueous resin compositions were used as a water borne coating, they gave a coating film excellent in various physical properties such as corrosion resistance, weather resistance, impact resistance, and adhesion.

The aqueous resin composition according to the present invention is particularly useful as a sizing agent for fibrous materials such as glass fiber or as a water borne coating.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

This application claims the priority of Japanese Patent Application No. 2000-281707 filed Sep. 18, 2000, which is incorporated herein by reference.

What is claimed is:

1. A sizing agent for a fibrous material which comprises an aqueous resin composition comprising (A) a polyepoxy compound represented by formula (I):

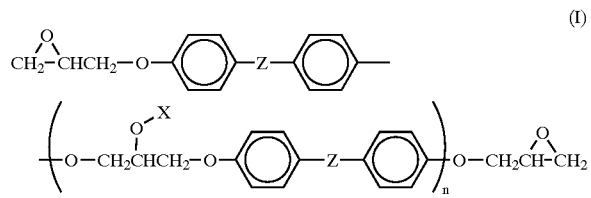

wherein n represents a number of from 0.1 to 20; Z represents a single bond, an alkylidene group having 1 to 4 carbon atoms or a SO$_2$; and X represents a hydrogen atom or a glycidyl group, provided that at least 10% of nX's represent a glycidyl group and water.

2. The sizing agent according to claim 1, wherein said polyepoxy compound (A) is one represented by formula (I) in which n represents 1 to 15, and 30% or more of nX's represent a glycidyl group.

3. The sizing agent according to claim 1, which further comprises 0.01 to 30 parts by weight of (B) at least one polyether compound obtained by condensing at least one polyol compound selected from the group consisting of (a) a bisphenol compound-alkylene oxide adduct, (b) polyethylene glycol, and (c) a polyoxyethylene-polyoxypropylene block or random copolymer with (d) a polyisocyanate compound per 100 parts by weight of said polyepoxy compound (A).

4. The sizing agent according to claim 1, wherein said fibrous material is glass fiber.

5. A strand of glass fibers having been treated with the sizing agent according to claim 1.

6. A glass fiber-reinforced resin composition having incorporated therein the strands according to claim 5.

* * * * *